United States Patent [19]

Saele

[11] 4,249,922
[45] Feb. 10, 1981

[54] EXTRACTOR TUBE ARRANGEMENT FOR INTERNAL COMBUSTION ENGINE AIR CLEANER SYSTEM

[75] Inventor: Arvid H. Saele, Dubuque, Iowa

[73] Assignee: Deere & Company, Moline, Ill.

[21] Appl. No.: 124,431

[22] Filed: Feb. 25, 1980

Related U.S. Application Data

[63] Continuation-in-part of Ser. No. 21,057, Mar. 16, 1979, abandoned.

[51] Int. Cl.³ .................. B01D 50/00; B60K 13/02
[52] U.S. Cl. .................. 55/315; 55/385 B; 55/431; 55/DIG. 28; 180/54 A; 180/69 R
[58] Field of Search .................. 55/315, 385 B, 431, 55/482, DIG. 28; 180/54 A, 69 R, 69.01

[56] References Cited

U.S. PATENT DOCUMENTS

| | | | |
|---|---|---|---|
| 3,137,553 | 6/1964 | Billey | 55/431 |
| 3,378,994 | 4/1968 | Farr | 55/431 |
| 3,740,932 | 6/1973 | Borsheim | 55/431 |

FOREIGN PATENT DOCUMENTS 405367 8/1943 Italy .................. 55/DIG. 28

OTHER PUBLICATIONS

RW Precleaner and Aspirator, Diesel Service, Inc., 215 E. Second St., Kimball, Nebraska 69145.

*Primary Examiner*—David L. Lacey

[57] ABSTRACT

An air cleaning system for an internal combustion engine includes an air cleaner inlet duct projecting through the engine compartment hood and coupled to a precleaner having a contaminant collecting bowl located above the hood. An extractor tube has one end coupled to the bowl and extends downwardly within the duct from the bowl to a location below the hood where it exits the duct and extends beneath the hood and is coupled to an aspirator incorporated in an exhaust conduit forming part of an exhaust muffler projecting upwardly through the hood.

3 Claims, 1 Drawing Figure

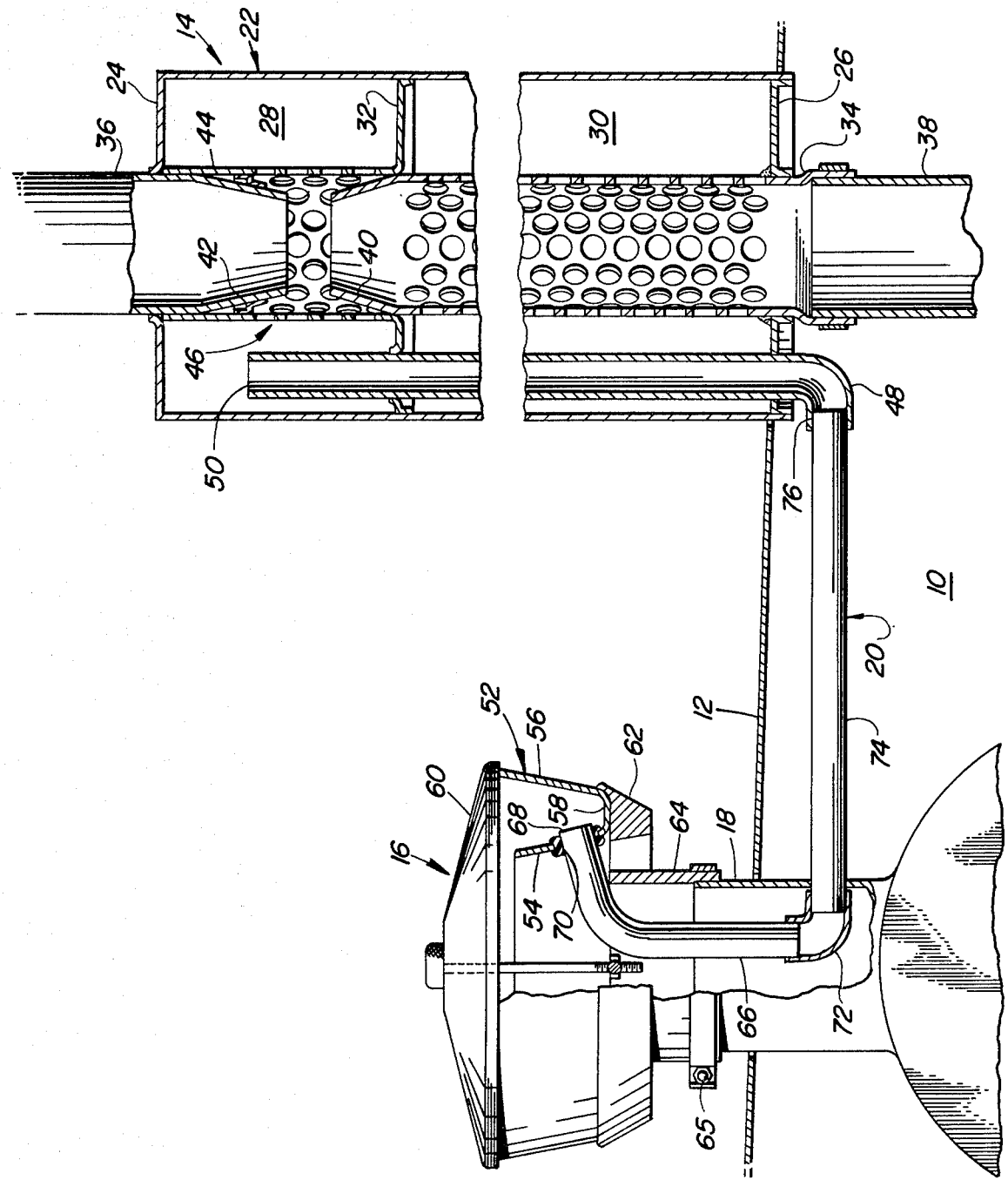

EXTRACTOR TUBE ARRANGEMENT FOR INTERNAL COMBUSTION ENGINE AIR CLEANER SYSTEM

CROSS REFERENCE TO RELATED APPLICATION

This application is a continuation-in-part of U.S. application Ser. No. 021,057 filed on Mar. 16, 1979, abandoned on Apr. 10, 1980.

BACKGROUND OF THE INVENTION

The present invention relates to air cleaning systems for internal combustion engines and more particularly relates to an extractor tube arrangement for such systems.

It is known to provide vehicles such as industrial and agricultural tractors and the like with air cleaning systems including precleaners and aspirators connected to the precleaners for automatically removing contaminants from collecting bowls of the precleaners. In some of these systems, the precleaner and an exhaust conduit incorporating the aspirator are located above the hood of the engine compartment and are interconnected by an extractor tube such that the exhaust gases draw contaminants from the precleaner through the extractor tube and convey them to the atmosphere.

Heretofore, such extractor tubes have been located such as to be above the hood. This location of the extractor tubes is not entirely satisfactory since the tubes when so located may limit visibility and be prone to damage by overhanging branches should the vehicle be operated in and about trees or tall brush and the tubes detract from the appearance of the hood area of the vehicle.

SUMMARY OF THE INVENTION

According to the present invention, there is provided a novel extractor tube arrangement for use in air cleaning systems including a precleaner located above the engine compartment and coupled to the air cleaner via an inlet duct projecting through the compartment hood.

An object of the invention is to provide an air cleaning system of the type described above wherein the extractor tube is located such as to be out of the line of sight of an operator and to be protected from being engaged by overhanging tree branches or brush and the like.

A more specific object is to provide an air cleaning system having an extractor tube connected between a contaminant catching bowl of a precleaner and an aspirator incorporated in am exhaust conduit, the tube extending along a path extending interiorly of the precleaner, an air intake duct of the air cleaner projecting through the engine compartment hood and then through a wall of the duct and beneath the hood.

These and other objects will become apparent from a reading of the ensuing description, together with the appended drawing.

BRIEF DESCRIPTION OF THE DRAWING

The sole FIGURE is a side elevational view, with parts in section, of an internal combustion engine compartment, together with an air cleaning system constructed in accordance with the principles of the present invention.

DESCRIPTION OF THE PREFERRED EMBODIMENT

Referring now to the drawing, therein is shown an engine compartment 10 defined in part by a hood 12. An engine exhaust muffler 14 projects vertically through a forward location of the hood and rearwardly of the muffler is a precleaner 16, which is located above the hood 12 and coupled to the upper end of an air cleaner intake duct 18 projecting through the hood 12. As will be described in more detail below, an extractor tube 20 is coupled between the precleaner 16 and the muffler 14, the latter being constructed in a well known manner to include an aspirator section which operates such that exhaust gases expelled from the muffler will draw and convey contaminants, such as dust, from the precleaner and to the atmosphere.

Specifically, the muffler 14 includes an outer shell 22 in the form of a tube closed at upper and lower ends thereof by walls 24 and 26, respectively, and divided into upper and lower chambers 28 and 30, respectively by a partition or intermediate wall 32 spaced below the wall 24. Projecting centrally through and supported by the walls 24, 26 and 32 is a central exhaust conduit including an inlet tube 34 and an outlet tube 36, the inlet tube 34 having a lower end coupled to an exhaust pipe 38 and having an upper end portion 40 which converges upwardly from the partition 32 and terminates at a location intermediate the walls 24 and 32. The outlet tube 36 projects centrally through the wall 24 and has a lower end portion 42 which converges downwardly from the wall 24 and terminates in vertically spaced relationship to the upper end portion 40 of the inlet tube 36. Extending between the walls 22 and 32 and disposed in surrounding relationship to the tube end portions 40 and 42 is a short perforated tube 44.

The converging tube end portions 40 and 42 cooperate to define an aspirator 46. The extractor tube 20 includes a first upright section 48 projecting upwardly through the walls 26 and 32 and having an open upper end defining a discharge outlet 50 located in the upper chamber 28. Thus the muffler shell 22 and wall 32 serve as a coupling which connects the tube 22 in fluid communication with the aspirator 46 such that the latter will act to create a suction at the outlet 50 of the extractor tube 20 when exhaust gases flow through the muffler.

The precleaner 16 includes an annular contaminant catching bowl 52 having outer and inner annular walls 54 and 56 respectively joined by a bottom wall 58. A cap 60 is received over the bowl 52. The bottom wall 58 of the bowl 52 is positioned against a base member 62 having a cylindrical portion 64 received on the top of the duct 18 and secured thereto by a conventional clamp 65. The extractor tube 20 has a second upright section 66 including an upper end 68 received in an opening 70 provided in the inner wall 54 of the bowl 52. The section 66 extends interiorly of the precleaner 16 and the duct 18 and has a lower end coupled, as at 72, to one end of an intermediate section 74 of the tube 20 extending horizontally through the duct 18 at a location below the hood 12. A second end of the section 74 is connected as at 76, to the lower end of the first upright section 48 of the tube 20.

It is to be understood that while the exhaust muffler 14 is shown as projecting vertically through the hood 12, the invention would also be applicable to engines having side-located mufflers providing the muffler has an extractor tube extending thereinto at a level below that of the hood.

The operation of the invention is thought to be clear from the foregoing description and for the sake of brevity no further description of the operation is presented.

I claim:

1. In combination with an engine compartment defined in part by a hood, an air cleaning system including an air cleaner located beneath the hood and having an inlet duct projecting upwardly therethrough, an engine exhaust conduit incorporating an aspirator and projecting upwardly through the hood, a precleaner coupled to the inlet duct and having a contaminant collecting bowl, and an extractor tube coupled between the bowl and the aspirator, an improved arrangement of the extractor tube comprising: said tube being located entirely within the precleaner, duct and compartment from a location closely adjacent the exhaust conduit to the bowl.

2. The air cleaning system defined in claim 1 wherein the precleaner bowl includes annular inner and outer walls coupled by an annular bottom wall; said extractor tube including a first upright section having one end located in the inner wall, the upright section extending downwardly from said inner wall into said duct to a location below the hood; and a generally horizontally extending intermediate section connected to the first upright section at said location and extending through a wall of the duct.

3. An air cleaning system in combination with an engine compartment defined in part by a hood, comprising: an air cleaner intake duct projecting vertically through the hood; a preclaner coupled to the duct and having a contaminant collecting bowl located above the hood; an aspirator; a coupling connected to the aspirator and located at least partly at a level below the hood; and an extractor tube extending beneath the hood between and respectively entering the coupling and the duct at respective locations below the hood and proceeding from the location whereat it enters the duct to the bowl by a path entirely within the duct and precleaner.

* * * * *